July 21, 1964

J. A. BROWNING 3,141,953

ELECTRIC ARC TORCHES

Filed March 5, 1962

JAMES A. BROWNING
INVENTOR.

BY W. B. Moeser

3,141,953
ELECTRIC ARC TORCHES
James A. Browning, Hanover, N.H., assignor to Thermal Dynamics Corporation, a corporation of New Hampshire
Filed Mar. 5, 1962, Ser. No. 177,629
6 Claims. (Cl. 219—145)

My invention relates to electric arc torches and is more particularly directed to improved electrode configurations and improved cooling means whereby efficient operation with air or other fluids containing reactive gases is made feasible.

In studies on the possible use of air as a plasma forming gas in electric arc torches it became apparent that effective cooling plays one of the major roles in achieving economical electrode life. Further, it was found that with a properly designed electrode, the process of initial erosion itself, using air, resulted in changes in the electrode shape which significantly reduced subsequent rates of erosion to economically tolerable levels.

It will be appreciated that an electric arc torch in which air may be used represents a great step in this art, in that the cost of operation with air is dramatically below that of any other gas or mixture of gases.

It is, accordingly, a major object of my invention to provide an electric arc torch so designed as to make practical the use of air as the arc-stabilizing and plasma forming gas.

Figure 1:
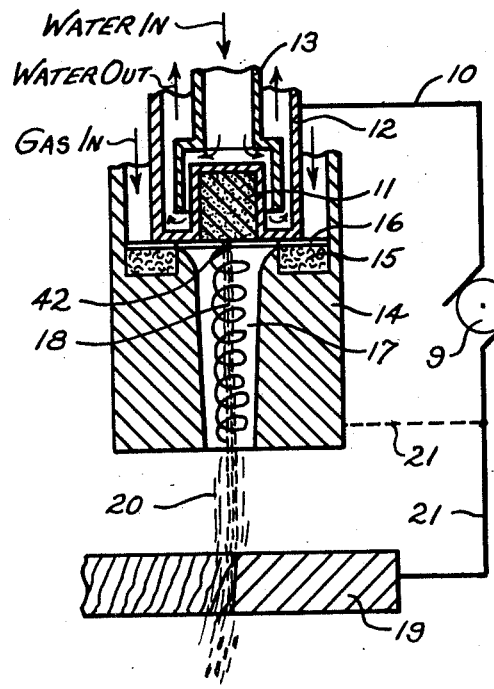
Figures 2A, 2B:
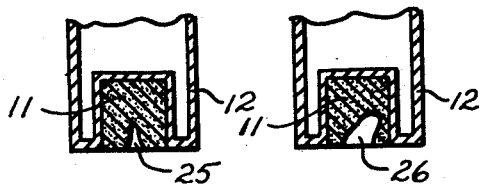
Figure 2C:
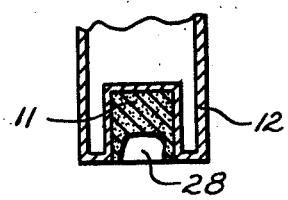
Figure 4:
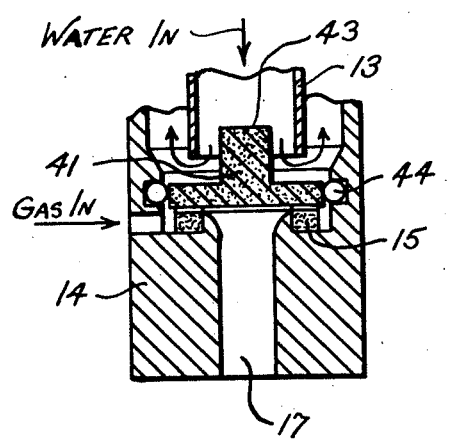
Figure 3A:
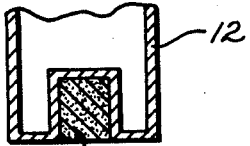
Figures 3B, 3C:
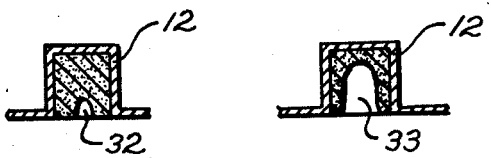

Other objects and advantages of my invention will become apparent from the following detailed description and the accompanying drawings, in which FIGURE 1 is a view in cross section of an arc torch incorporating the invention;

FIGURES 2a, 2b and 2c are detailed views, in cross section, of the cathode element of the torch of FIGURE 1, showing progressive changes during use;

FIGURES 3a, 3b and 3c likewise show progressive changes in a modified form of cathode element; and FIGURE 4 is a detailed view of another form of the invention.

Referring now more particularly to the drawings, a torch, FIGURE 1, is shown, having an electrode assembly comprising a tungsten insert 11, held in a piece 12, which may be made of copper. The insert 11, is preferably silver-brazed into the piece 12, thus being in intimate thermal contact with the copper holder. The piece 12, has a thin walled re-entrant section as shown into which the tungsten insert 11 is nested. By reason of the re-entrant section extending back into the piece 12, a cooling jacket is thus formed around the section. Power is supplied to the electrode assembly through lead 10 from a suitable source 9. Although D.C. is commonly used in torches of this type, it is possible to use A.C. within the spirit of this invention.

The electric circuit is completed by an arc stream 18, a workpiece 19, and a lead 21, back to the source 9. The arc stream 18, passes through a passageway 17, in a nozzle 14. The torch is shown in what is called the transferred mode of operation; that is, the arc stream leaves the torch itself and the electrical return is completed through a workpiece to be heated, cut, or otherwise treated. The invention is equally applicable to the non-transferred mode of operation in which the nozzle 14, becomes the anode with lead 21, assuming the position shown in the dotted line. In such case, the arc stream 18, terminates against the inner wall of the passageway 17. What then emerges from the nozzle 14, is the heated gas 20, in varying states (ionized, plasma or both) depending upon the temperature developed.

The cathode is mechanically and electrically separated from the nozzle 14 (which may be the anode as explained), by a ceramic swirl ring 15, having a plurality of tangential slots 16. This ring and its function are fully explained in U.S. patent application No. 56,221 filed September 15, 1960, now Patent No. 3,027,446. Plasma forming gas, in this case air, is introduced under pressure as shown and enters the passageway 17 in a strong vortex. The cathode is force-cooled by supplying water or other fluid cooling medium under pressure through a tube 13. I prefer to have the exit end of the tube 13 extend well over the re-entrant portion of the piece 12, thus supplying coolant directly to all sides of the insert 11 except, of course, the arc-emitting side facing the passageway 17. It will be appreciated that the only material between the coolant and the insert 11 is merely a thin shell of metal of high heat conductivity, such as copper.

Turning now to FIGURES 2a, 2b and 2c it will be seen that a new insert 11 begins with an initially flat terminal face from which the arc stream 18, projects. After a period of operation, the hot electrode material is eroded to form the narrow crater 25 of FIGURE 2a. The arcing spot remains centrally positioned at the bottom of the crater 25.

I have found that as the erosion continues with further use of the torch, the arc spot tends to drift away from the electrode centerline. Specifically, an asymmetric crater 26 of FIGURE 2b begins to develop. The arc spot continues to drift radially until it reaches a point close to the edge of the refractory material of the insert 11. In all cases (including many tests for periods ranging from 5 to 10 hours) the arc spot, once it approaches the interface between the insert 11 and the copper shell of the piece 12, swings to another position. In no case did the arc spot penetrate into the copper. FIGURE 2c illustrates the geometry resulting from continued use, and it will be seen that crater diameter nearly equals that of the refractory insert itself.

For a ¼ inch diameter insert 11, the crater produced after from four to six hours of operation at 200 amperes approached that shown in FIGURE 2c. The diameter of the resulting "well" is larger (in this case) than optimum. It is desirable to maintain a crater diameter which is smaller than the diameter of the low pressure gas vortex core. The mechanism of the action of the well-shaped electrode and its relationship to gas flow are fully explained in U.S. patent application No. 107,421, filed May 3, 1961, now Patent No. 3,118,046. Suffice to say here that a crater diameter which is larger than the vortex core permits air to impinge on the crater walls, thus increasing the rate of erosion.

Under conditions of test in the table below, the eroded well had a diameter of slightly over one-eighth of an inch and approximately the same depth:

Table I

| | |
|---|---|
| Insert diameter | ¼". |
| Insert material | Thoriated tungsten. |
| Insert length | ¼". |
| Operating current | 200 amperes. |
| Operating voltage | 140–150 volts. |
| Operating mode | Transferred arc. |

The test run was interrupted at periodic intervals to determine the rate and nature of the erosion. It was found that the entire inner surface of the well (except for the small cathode spot 42) was covered by a layer of yellow oxide material of from 0.001 to 0.005 inch thick. I believe that it is this oxide film which protects the tungsten electrode from the usual rapid and continuing erosion of such an electrode in an oxidizing atmosphere such as air. The arc spot itself measures about one thirty-second of an inch in diameter and appears as a dark spot entirely surrounded by the yellow oxide film. It is probable that the arc spot drifts arbitrarily over the bottom surface of the well, with the oxide film protecting the remaining inner surface of the well from oxidization.

It is essential to the formation of this desirable oxide film that the insert material be adequately cooled. This cooling must keep the tungsten surface (except at the arcing spot) at a sufficiently low temperature to preclude melting or spalling of the oxide film. In the absence of the film, as would be the case when adequate cooling was not provided, the entire hot surface of the tungsten would be continuously exposed to the oxidizing action of the air. Without the formation of this oxide film, a tungsten electrode of initially flat geometry would stand-up for a matter of less than a minute under the conditions of these tests.

Although the melting point of tungsten metal is high (3400 degrees C.), the oxide has a much lower melting point. This fact explains the successful operation of a white-hot electrode when utilizing non-oxidizing gases. However, when an electrode remains at a temperature capable of preventing the formation of the oxide film, such an electrode is nearly worthless when used with air.

The oxide film was observed in its solid state. It is possible that during operation it may be a molten film. In either case it provides the protection required. It is perhaps of importance, if the film is actually molten, that the arcing area be contained in a well region characterized by low gas momentum. High gas velocities would sweep such a film from the tungsten surface thus exposing the metal to the air. This may explain the short electrode life of "stick" electrodes in air, but the long life where the arc emanates from the well.

To take better advantage of the foregoing findings, inserts 11 of smaller diameter were used, and their rates of erosion dropped significantly. This improvement in performance resulted from more effective cooling (with the arc spot being physically closer to the cooling medium) combined with the development, by initial erosion, of a well having an optimum diameter as discussed above.

FIGURES 3a, 3b and 3c illustrate an insert 30 of reduced diameter. In this case insert 30 is one-eighth of an inch in diameter. After extended operation the crater 32 of FIGURE 3b is produced. Although the arc spot still drifts somewhat from the centerline, further operation produces the relatively narrow well geometry 33 of FIGURE 3c. The walls of the crater 33 are covered (except at the arcing spot) by a layer of oxide material as explained above.

The smaller insert piece of FIGURE 3a is capable of much longer operation than the larger insert of FIGURE 2a. The use of the correct insert diameter leads to the establishment by erosion, of optimum well geometry. The mass erosion rate of the one-eighth inch insert compared to that of the one-fourth inch insert is considerably less. Also, the speed of penetration of the crater into the insert is markedly less. Such an improved electrode provides for much longer operating times, all other conditions being the same. Or alternatively, if the erosion rates are adjusted to produce the same operating life, much higher current levels can be used for the smaller electrode piece.

The mechanism by which the arcing spot always remains on the refractory piece rather than following a path into the piece 12, is not well understood. It may be that the arc spot favors the material of lower work function. Undoubtedly, the higher cooling rate experienced as the interface region is approached is also an important factor. Regardless of the mechanism involved, I have found that the well diameter can be controlled by choice of diameter of the original insert.

This improved geometry makes the principles of this invention applicable to the use of both non-eroding gases as well as chemically active gases such as oxygen and carbon dioxide. The better cooling results from the shorter heat path through the refractory material (which usually has a lower coefficient of heat transfer than the holder piece) and the large surface areas presented to the cooling medium.

The minimum diameter of the insert is dictated by the possible deterioration of the braze material contained at the interface between the insert and its holder. The insert piece is raised to high temperature by the arcing action. This heating is a function of the amperes of current flowing. Where a one-eighth inch insert is a desirable size for a current of 200 amperes, much higher currents may lead to melting of the braze metal. In such a case larger inserts may be required, although the size should be kept to a minimum under a particular set of operating conditions.

FIGURE 4 illustrates an electrode of single-piece construction. In this case the electrode element 41 is made entirely of a refractory material and has a small cylindrical portion 43 which terminates in a thin disc of greater diameter. The increased diameter is provided to allow an O-ring seal 44 at temperatures which will not decompose the usual O-ring materials. When using air, a crater erodes back into the cylindrical section 43, leaving a thin shell of refractory material. The resulting well is governed by the diameter of the cylinder 43.

Although the fluid described for use with the electrode of this invention has been described as a gas, water, other liquids, and mixtures of liquids and gases are also applicable.

While I have described particular examples of my invention for illustrative purposes, further modification within the spirit and scope of the appended claims may occur to others skilled in this art.

I claim:

1. An electrode assembly for an electric arc torch comprising:
   (a) an electrode holder in the form of a hollow, tubular, electrically conductive element sealed at one end by a cap member having a thin-walled re-entrant cavity extending back into said element to thus form a cooling jacket surrounding the re-entrant cavity, and
   (b) an electrically conductive refractory material fitted into and substantially filling said re-entrant cavity and having a flat outer electrode surface, the coefficient of thermal conductivity of the electrode holder being substantially greater than that of the refractory material.

2. An electrode assembly as defined in claim 1 further characterized by the refractory material having a lower work function than the electrode holder.

3. An electrode assembly as defined in claim 1 further including means for circulating a cooling medium through the cooling jacket surrounding the re-entrant cavity.

4. An electric arc torch assembly comprising:
   (a) a nozzle member having an arc passage extending therethrough,
   (b) means for introducing a plasma forming gas into the passage to form a vortex therein,
   (c) an arc-emitting electrode sub-assembly including a hollow, electrically conductive element sealed at one end by a cap member having a thin-walled re-entrant cavity extending back into the element and an electrically conductive refractory material substantially filling the re-entrant cavity and having a flat outer surface facing the passage, the surface area of the refractory material being aligned with and smaller than the low pressure core developed by the vortex, and
   (d) means for circulating a cooling medium through the element and around the re-entrant cavity.

5. A method for operating an electric arc torch having at least one exposed electrode surface comprising the discrete steps of:
   (a) establishing an electric arc emanating from the exposed surface of the electrode, (b) supplying a vortex of reactive gas to the arc torch and in contact with the exposed electrode surface to stabilize the arc and form a plasma effluent, whereby a cavity gradually forms in the exposed electrode surface, and (c) cooling the walls of the cavity below the vaporization temperature of the oxide of the electrode material, whereby a protective film of the oxide of the electrode material forms on the walls of the cavity to substantially reduce the erosion rate of the electrode.

6. A method of operating an electric arc torch as defined in claim 5, wherein the reactive gas is air.

References Cited in the file of this patent

UNITED STATES PATENTS

| | | |
|---|---|---|
| 1,915,947 | Paugh | June 27, 1933 |
| 2,554,236 | Bernard | May 22, 1951 |
| 2,768,279 | Rava | Oct. 25, 1952 |

FOREIGN PATENTS

| | | |
|---|---|---|
| 345,003 | Italy | Dec. 7, 1936 |